United States Patent [19]

Cyr

[11] Patent Number: 4,924,446
[45] Date of Patent: May 8, 1990

[54] NAVIGATION SYSTEM AND METHOD FOR DETERMINING THE POSITION OF A RELATIVELY NOISY PLATFORM USING UNDERWATER TRANSPONDERS

[75] Inventor: Reginald J. Cyr, Santa Barbara, Calif.
[73] Assignee: Sonatech, Inc., Santa Barbara, Calif.
[21] Appl. No.: 308,653
[22] Filed: Feb. 9, 1989
[51] Int. Cl.$^5$ .......................... H04B 1/59; G01S 3/80
[52] U.S. Cl. ........................................ 367/6; 367/130; 367/907
[58] Field of Search ...................... 367/2, 6, 130, 907

[56] References Cited

U.S. PATENT DOCUMENTS

| | | | |
|---|---|---|---|
| 3,860,900 | 1/1975 | Scudder | 367/6 |
| 4,097,837 | 6/1978 | Cyr | 367/6 |
| 4,110,726 | 8/1978 | Dorrance et al. | 367/6 |
| 4,229,809 | 10/1980 | Schwalbe | 367/6 |
| 4,555,779 | 11/1985 | Roberts | 367/6 |
| 4,635,236 | 1/1987 | Roberts | 367/6 |

Primary Examiner—Thomas H. Tarcza
Assistant Examiner—Daniel T. Pihulic
Attorney, Agent, or Firm—Ladas & Parry

[57] ABSTRACT

A system for acoustically positioning a noisy platform. An array of transponders, adapted to be deployed in a region of water, is provided. A transducer is mounted on the noisy platform and another transducer is mounted on a relatively quiet vehicle tethered to the platform. A first means is provided for transmitting acoustical energy from the transducer on the noisy platform to said array and from said array to said transducer on said vehicle for measuring the distance from said noisy platform to said quiet vehicle via said transponders in said array. A second means is provided for transmitting acoustical energy from the transducer on said vehicle to said array and back to said vehicle for measuring the distance said vehicle is from the transponders in said array. Calculating means is coupled to said first and second means for determining the location of said noisy platform relative to said array.

9 Claims, 3 Drawing Sheets

NAVIGATION SYSTEM AND METHOD FOR DETERMINING THE POSITION OF A RELATIVELY NOISY PLATFORM USING UNDERWATER TRANSPONDERS

FIELD OF THE INVENTION

The instant invention relates to a navigation system and a method of determining the position of a relatively noisy platform (which can be either a surface ship, other vessel or a submersible) relative to an array of underwater transponders.

BACKGROUND OF THE INVENTION

Various commercial, scientific and military operations require that a platform on or in the ocean be accurately located with respect to an array of previously positioned transponders. The platform can be a vessel, a surface ship or a submersible.

Such technology is well known. The first step is to deploy an array of transponders underwater and thence to accurately calibrate their relative or absolute positions. Techniques for calibrating an array of underwater transponders are well known and are described in the applicant's prior U.S. Pat. No. 4,097,837, for example, and in other publications such as T. D. Henry's paper entitled "ACOUSTIC TRANSPONDER NAVIGATION", CONFERENCE: IEEE 1978, Position Location and Symposium, San Diego, CA (6–9 Nov. 1978).

After the array of transponders has been position calibrated, it is well known to use various methods of acoustically signaling between the array and a vessel, for example, so as to locate the vessel vis-a-vis the array. The array can comprise as few as two transponders, such as disclosed in U.S. Pat. No. 4,229,809 to Schwalbe. Schwalbe describes an acoustic underwater position measurement system for determining the location of objects, such as submersible vessels, mining apparatus, and the like with respect to a surface vessel.

U.S. Pat. No. 3,860,900 to Scudder teaches a method of monitoring the position of a towed underwater apparatus using an array of three submerged transponders.

Other U.S. patents dealing with techniques for locating something vis-a-vis an array of underwater transponders include U.S. Pat. Nos. 4,635,236; 4,555,779; 4,110,726. A paper by L. W. Proctor, "SONAR SYSTEM FOR FISH DETECTION IN DEEP WATER": Conference: Instrumentation on Oceanography, Bangor, Wales, (22-25 Sept. 1975), discusses the problems inherent in a hull mounted sonar system.

An advantage of using acoustic transponders is that they can provide a highly accurate navigational fix, but a concomitant disadvantage is that they can generally be used only over a relatively small area. Depending upon local bathymetry and weather conditions, acoustic transponders are generally spaced within a small multiple of the water depth in which they are located. If the object whose location is to be measured is either a ship or a submersible, on board ship noise from propulsion equipment, auxiliary equipment, propeller and water noise tend to mask acoustic signals coming from transponders and thereby impose further constraints on the distances over which this technology can be used. That is, the ship or submersible must be sufficiently close to the transponders so that the acoustic signals generated by the transponder can be heard over the noise generated by the ship or submersible. It is, therefore, an object of this invention to eliminate or reduce the masking of acoustic signals which can otherwise occur on a relatively noisy platform.

DETAILED DESCRIPTION OF THE DRAWINGS

DETAILED DESCRIPTION OF THE INVENTION

Figure 1:
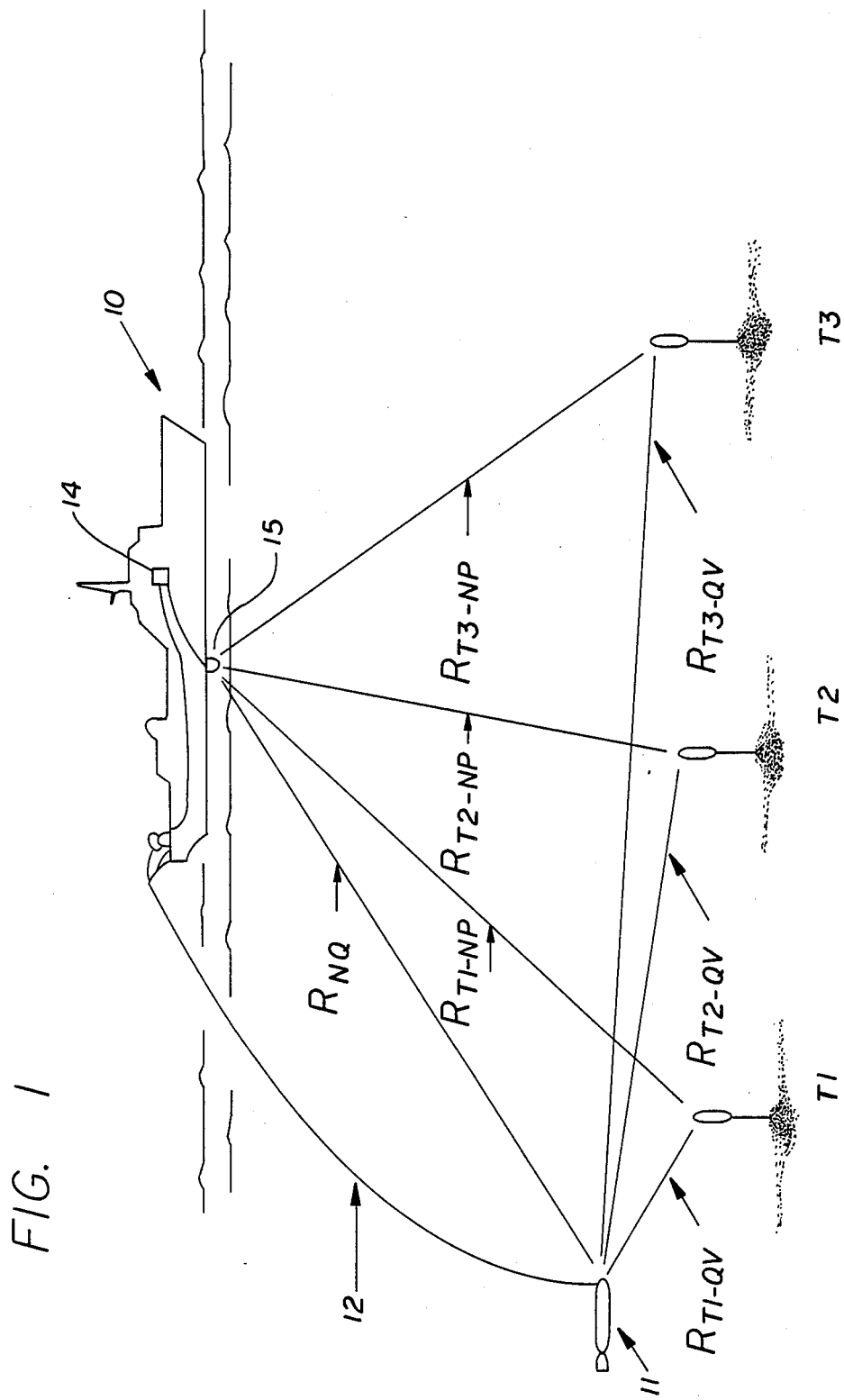
FIG. 1 is a diagrammatic representation of one embodiment of a navigation system and method useful in practicing the present invention where the noisy platform is a ship and the relatively quiet vehicle is a submersible.

FIG. 1 illustrates, in diagrammatic form, a ship 10 and a submersible vehicle 11 tethered to the ship by means of a tow cable 12. Also shown is an array of submersible sonobuoys or transponders, T1, T2, T3 ... While three transponders are shown in the array in FIG. 1, those skilled in the art will appreciate the fact that either fewer or more transponders may form the array, depending upon the accuracy of the fix desired. Those skilled in the art will also appreciate that the transponders are typically responsive to acoustic energy received thereat (in which it is typically referred to as an "interrogation" signal) for the purpose of generating responsive acoustic energy (which is typically referred to as a "reply" signal). In the underwater environment, the interrogation signal and the reply signal must have some means of differentiation, which is typically provided by having the interrogation signal and the reply signal occur at different frequencies. Additionally, the transponders can be responsive to a number of interrogation signals at differing frequencies for the purpose of generating a common or different reply frequency signals. The reader is directed to the inventor's prior U.S. Pat. No. 4,097,837 for further information in this regard. The disclosure of U.S. Pat. No. 4,097,837 is hereby incorporated herein by this reference.

The ship shown in FIG. 1 has an acoustic transmitter on its hull at numeral 15. The ship may also have an acoustic receiver, but the acoustic receiver need not be used when practicing the present invention. Submersible vehicle 11 has both an acoustic transmitter and an acoustic receiver which is electrically coupled to control and calculating equipment diagrammatically shown at numeral 14, disposed on board ship 10. This equipment also controls the operation of transmitter 15 and the operation of the acoustic transmitter and receiver on vehicle 11. Suitable control and calculating equipment 14 is sold by Sonatech, Inc. of Santa Barbara, Calif. under the trademark SONATRACK II.

In order to locate the position of ship 10, the array of underwater transponders, T1, T2, T3 ..., must first be calibrated and that may be done, for example, in accordance with the teachings of my prior U.S. Pat. No. 4,097,837 discussed above.

After the array has been calibrated, if the acoustic ranges $R_{T1-NP}$, $R_{T2-NP}$ and $R_{T3-NP}$ are determined, then the ship's position can be readily calculated. In the prior art, this would have typically been accomplished by the ship sending out one or more acoustic "interrogation" signals to the array of transponders which would then respond with "reply" signals which would be picked up by a receiver located on the ship, assuming that the ship was sufficiently close to the array to "hear" the reply signals over the ship's ambient noise. As the ship's ambient noise increases, the closer it must be to the array of transponders for this technique to operate satisfactorily. If the ship cannot "hear" the acoustic reply signals from some or all of the transponders in the array, the ship either loses accuracy in its fixes, or worse is not able to do a fix at all.

In accordance with the present invention, a tethered vehicle, such as submersible 11, is deployed which is in acoustic communication with the array of transponders and preferably with the ship. Furthermore, submersible 11 is in electrical communication with the control and calculating equipment 14 aboard ship 10 via tow cable 12. A number of acoustic ranges are depicted in the figures using the letter "R" with various subscripts. The NQ subscript stands for Noisy Platform to Quiet Vehicle, the T1-QV subscript stands for transponder T1 to Quiet Vehicle, while the T1-NP subscript stands for transponder T1 to Noisy Platform. Transponders T2 and T3 are identified as such in the subscripts. In this embodiment the ship 10 is the Noisy Platform while the submersible 11 is the Quiet Vehicle. These ranges will be used in the following discussion of the apparatus and method for measuring the position of a relatively noisy platform, such as ship 10, using a relatively Quiet Vehicle, such as submersible 11, and an array of transponders T1, T2, T3 . . .

In accordance with the present invention, the Noisy Platform, for example, ship 10, must transmit one or more acoustic interrogation signals to which both the array of transponders T1, T2, T3 . . . and Quiet Vehicle, for example, submersible 11, are responsive. Whether a single interrogation signal or a number of interrogation signals are transmitted from the transmitter 15 located on ship 10 depends on whether or not the receiver electronics of the array operate on a common interrogation signal basis. Generally speaking, in an array of transponders, the transponders are generally responsive either to (1) a common interrogation signal or (2) unique interrogation signals. If the transponders are responsive to a common interrogation signal, then they typically each generate a unique reply signal in response thereto so that the individual transponders can be differentiated by the frequency, for example, of their unique reply signal. On the other hand, if each transponder is responsive to a unique interrogation signal, then the reply signal which is generated is typically a common reply signal (i.e., of the same frequency, for example).

Assuming, for the moment, that a common interrogation signal is used, then the ship 10 transmits that common interrogation signal which is received directly by submersible 11 and, depending upon the elapsed time between the generation of that signal at the ship 10 and its receipt at the submersible vehicle 11, which is electrically transmitted up the cable 12 to the ship, the acoustic range $R_{NQ}$ can be easily calculated using the aforementioned control and calculation equipment 14 aboard the ship 10. The array of transponders T1, T2, T3 . . . are similarly responsive to the common interrogation signal generated by the transmitter 15 on ship 10 and generate, in response thereto, a unique reply signal for each transponder. The receiver aboard the submersible vehicle 11 is responsive to each of the unique reply signals generated by the array of transponders. By measuring the elapsed time between the generation of the common interrogation signal and the receipt of each unique reply signal from each transponder, the acoustic ranges are RT1-NP plus $R_{T1\text{-}QV}$, $R_{T2\text{-}NP}$ plus $R_{T2\text{-}QV}$ and $R_{T3\text{-}NP}$ plus $R_{T3\text{-}QV}$ can be readily determined.

Now, if the transmitter aboard the submersible vehicle 11 is caused to transmit preferably the same common interrogation signal that the ship transmitted, and submersible vehicle 11 then listens for the reply signals generated by the transponders T1, T2, T3 . . . , and these replies are transmitted up the cable 12, then the distances $R_{T1}$, $R_{T2\text{-}QV}$, and $R_{T3\text{-}QV}$ can be easily calculated by measuring the elapsed times between the transmission of the common interrogation signal and the receipt of the various reply signals.

Thereafter, if the measured acoustic range $R_{T1\text{-}QV}$ is subtracted from the measured range $R_{T1\text{-}NP}$ plus $R_{T1\text{-}QV}$, the result is $R_{T1\text{-}NP}$, the acoustic range between the ship and transponder T1. Of course, this same calculation can be easily made for transponders T2 and T3 and having calculated $R_{T1\text{-}NP}$, $R_{T2\text{-}NP}$ and $R_{T3\text{-}NP}$, the position of the noisy platform, i.e., the ship, can be accurately fixed using known calculational techniques. Since the ship submissible vehicle will likely move relative to the array while the measurements are being made, such relative movement should be compensated for when using known calculational techniques to improve the accuracy of the fix.

In the foregoing description, it was assumed that the common interrogation signal was first transmitted from the ship 10 and thereafter from submersible vehicle 11. Those skilled in the art will appreciate, of course, that the order in which those common interrogation signals are broadcast and whether or not they are actually of the same frequency or of different frequencies, or whether the signals are electrically processed at the submersible or the ship is a matter of design choice.

Moreover, those skilled in the art will appreciate that whether a common interrogation signal or a unique interrogation signal system is used, is also a matter of design choice. Thus, instead of transmitting a common interrogation signal, the transmitter aboard ship 10 could transmit a series of unique interrogation signals and the transponders 10, in response thereto, generate a common reply signal. The receiver aboard submersible 11 would then listen for a common reply signal from each transponder for the purpose of calculating the distances $R_{T1\text{-}NP}$ plus $R_{T1\text{-}QV}$, $R_{T2\text{-}NP}$ plus $R_{T2\text{-}QV}$ and $R_{T3\text{-}NP}$ plus $R_{T3\text{-}QV}$. This submersible would also generate the unique interrogation signals to the transponders to receive the reply signals therefrom for the purpose of calculating the distances $R_{T1\text{-}QV}$, $R_{T2\text{-}QV}$ and $R_{T5\text{-}QV}$. Again, the order in which these various signals are generated, is a matter of design choice. Once the aforementioned acoustic ranges are determined, they can be subtracted from each other in the manner discussed above so as to calculate the acoustic ranges $R_{T1\text{-}NP}$, $R_{T2\text{-}NP}$ and $R_{T3\text{-}NP}$. Thereafter, the position of the ship can be accurately fixed using known calculational techniques.

The common interrogation signal first discussed above may be preferable to the unique interrogation signal technique discussed most recently above by reason of the fact that the amount of signaling required from the ship is reduced and therefore it may be possible to obtain more rapid (and hence, more accurate) position fixes due to the resulting higher data rate.

Those skilled in the art will appreciate that the $R_{NQ}$ measurement is not necessary, but that it improves the submersible z coordinate determination when it is in the plane of the transponders and, as another data point, improves the overall system accuracy.

Those skilled in the art will also appreciate that the interrogation signal can be generated first at either the ship, or the submersible vehicle, as a matter of design choice. Moreover, instead of using a common interrogation signal and unique reply signals, in order to differentiate one transponder from another, a unique interrogation signal may be used with a common reply signal (or even with a unique reply signal, if desired). The common interrogation signal system discussed in detail above is preferred since that minimizes the number of acoustic signals which must be generated by transmitter 15 and by the transmitter aboard submersible vehicle 11, which, as a result, permits the fix to be made and calculated more quickly.

As illustrated, the surface ship only transmits and the tethered submersible vehicle both transmits and receives. Since the surface ship transmits only, the surface ship's environmental noise due to its propulsion machinery, auxiliary systems, and the like, does not interfere with this technique since (1) no receiving need be accomplished aboard the ship and (2) the transmitted acoustic interrogation signal is always much more loud than is the ship's environmental noise.

Those skilled in the art will appreciate the fact that the distances shown in FIG. 1 are illustrative, and not to scale. Thus, the distance between the ship and the submersible vehicle may be significantly less than the distance between either the ship or the submersible vehicle and the various transponders in the array. Since the submersible vehicle may be located relatively close to the ship, the acoustic interrogation signal generated by the submersible vehicle is not likely to be masked by the ship's environmental noises and given the fact that ships of the type having a transmitter for generating acoustical sound are highly likely to also have a receiver for receiving acoustic sounds, that some practicing the instant invention may decide to measure the acoustic range $R_{NQ}$ at the same time that the submersible vehicle transmits one or more interrogation signals to the array of transponders T1, T2, T3... However, given the fact that the array of transponders T1, T2, T3 are likely to be considerably more distant from the ship than will be the submersible vehicle, the present invention offers the potential of using the described acoustic technique for accurately determining the position of a vessel relative to an array of transponders T1, T2, T3... which may be distinctly located relative to the vessel.

Figure 2:
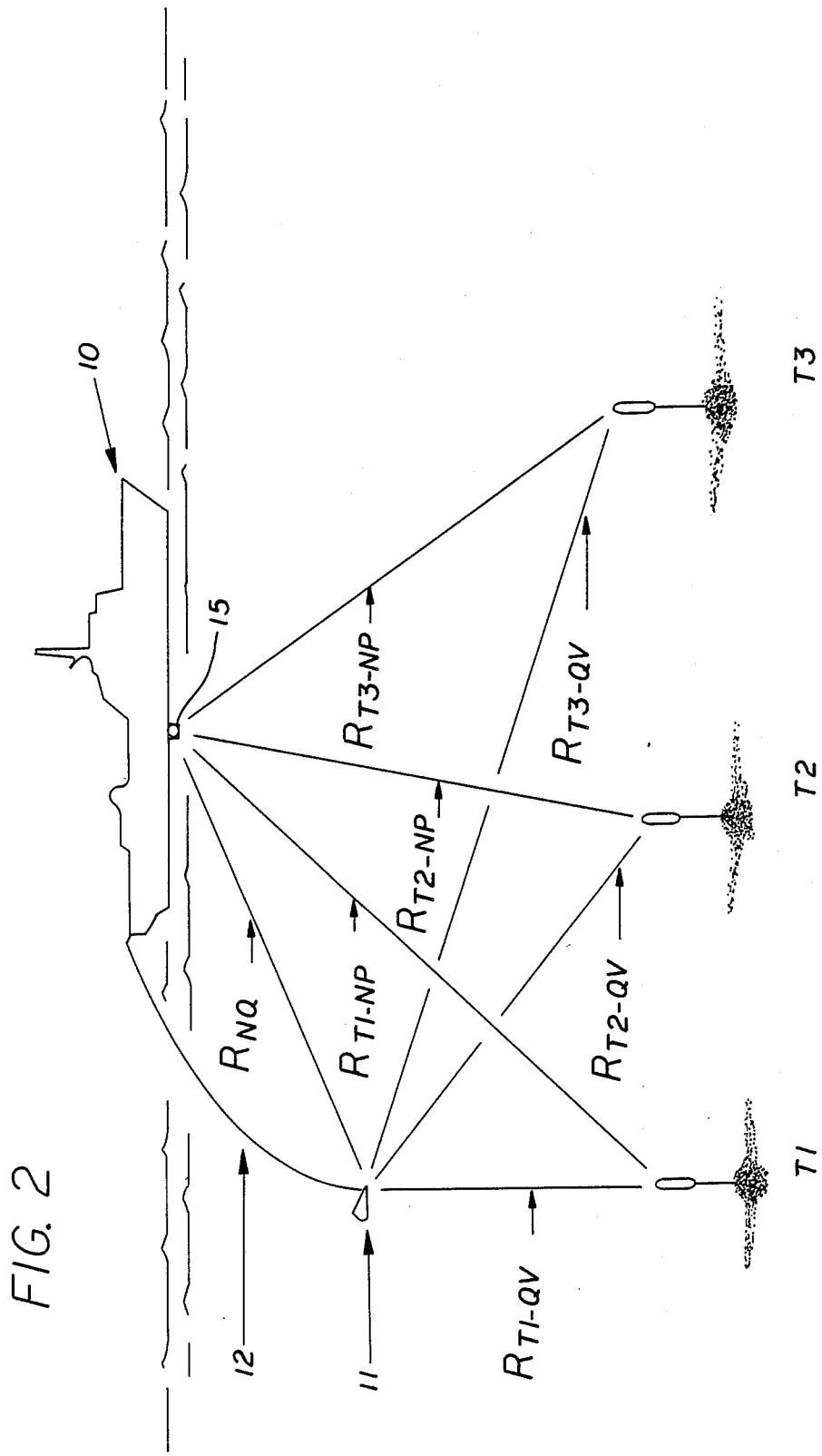
FIG. 2 is a diagrammatic representation of a second embodiment of a navigation system and method useful in practicing the present invention, similar to that of FIG. 1.

In FIG. 1, transmitter 15 is shown as being hull mounted on ship 10. Alternatively, transmitter 15 can be mounted in a tow fish or on cable 12 as shown by FIG. 2. Preferably, transmitter 15 is hull mounted as this reduces surface ship position errors.

Additionally, self-calibrating transponders of the type taught in the inventor's prior U.S. Pat. No. 4,079,837 are useful in minimizing a ship's time on station.

Typically, the submersible vehicle 11 shown in FIG. 1 would include appropriate band limiters and amplifiers connected to the receiver and transmitter electronics connected to the transmitter. Alternatively, a simple tow fish transducer 13 can be used wherein both the transmitter and receiver electronics for the tow fish transducer would be located aboard ship. A tow fish configuration of the invention is set forth in FIG. 2. This embodiment of the invention is very similar to the embodiment of FIG. 1, except that the tow fish transducer electronics may be located aboard ship and the tether cable 12 is only of a sufficient length to get the tow fish sufficiently far from the ship 10 to reduce background and environmental noise to an acceptable level.

Figure 3:
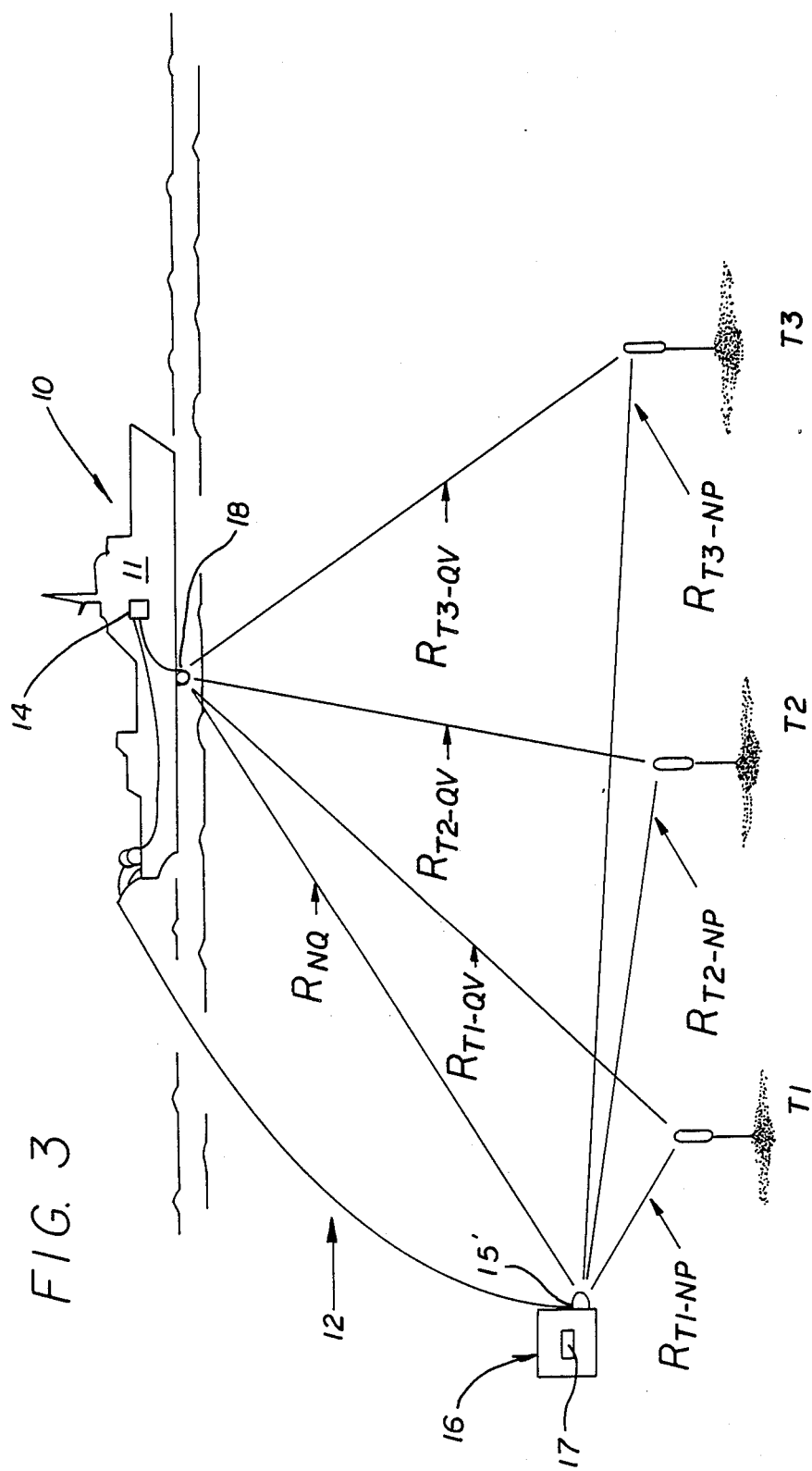
FIG. 3 is a diagrammatic representation of a third embodiment of a navigation system and method useful in practicing the present invention where the noisy platform is a submersible and the relatively quiet vehicle is the ship.

The foregoing description assumes that the ship 10 provides the relatively Noisy Platform while the submersible 11 is a relatively Quiet Vehicle. However, those skilled in the art, will appreciate that at times the ship may be relatively quiet compared to the submersible. In FIG. 3, for example, the submersible 16 is a work vehicle coupled to ship 10 via a tether 12, and the submersible 16 has thrusters 17 deployed thereon making the environmental noise at the submersible 16 possibly higher than the environmental noise at the ship 10. In this case, the ship 10 is the Quiet Vehicle 11 and the submersible 16 is the Noisy Platform. It should be appreciated, therefore, that a transmitting function only should occur at transducer 15' on submersible 16 while both transmitting and receiving functions should occur at the receiver 18 on the relatively Quiet Vehicle, namely, ship 10. FIG. 3 shows the various ranges (i.e., $R_{T1\text{-}NP}$ plus $R_{T1\text{-}QV}$ and $R_{T1\text{-}QV}$, etc.) which would be measured as before and, then, upon subtracting $R_{T1\text{-}QV}$ from $R_{T1\text{-}NP}$ plus $R_{T1\text{-}QV}$, the resulting range is, of course, the desired range $R_{T1\text{-}NP}$. Similar calculations would provide $R_{T2\text{-}NP}$, $R_{T3\text{-}NP}$, and so forth for all the transponders T1, T2, T3, ..., in the array, giving an accurate location fix of noisy platform 16.

Also, other transmitters can be added at other points of interest, for example, along a lift pipe having a suction vehicle or pod at the bottom thereof. The location of those points of interest, i.e., the transmitters, can be accurately tracked just as the location of transmitter 15 on the noisy submersible 16 of FIG. 3 can be accurately tracked. Thus, the configuration of the whole lift pipe arrangement can be accurately determined since the position of a number of transmitters disposed thereon can be accurately tracked. Those skilled in the art will appreciate that the different transmitter on the lift pipe can be differentiated by selecting appropriate interrogation and/or reply frequencies.

Having describing the invention with respect to certain embodiments thereof, modification may now suggest itself to those skilled in the art. For example, the transmitter 15 shown located on the hull of ship 10 could be moved off ship 10 and placed, instead, in the near vicinity of ship 10, such as on the tow cable 11. Of course, since the navigation system disclosed herein obtains an accurate fix of the position of transmitter 15, if transmitter 15 is not located on the ship, the result is an accurate fix of the transmitter, but a less accurate fix of the ship. Therefore, it is preferable to mount transmitter 15, 15' on the object whose location is to be measured, but it is not necessary to do so in order to practice the instant invention. The invention itself, therefore, is not to be limited to the invention as disclosed, except as required by the appended claims.

I claim:

1. A method of acoustically positioning a noisy platform comprising the steps of:
   (a) deploying said platform in a region in which an array of transponders have previously been deployed;
   (b) deploying a vehicle tethered to said platform;

(c) calculating a number of first acoustic ranges between said vehicle and the transponders in said array by transmitting at least one interrogation signal from said vehicle, each said transponders responding to said at least one interrogation signal by transmitting a reply signal, said vehicle having means to receive said reply signal, measuring the elapsed times between the generation of said at least one interrogation signal and the reception of said at least one reply signal at each transponders in said array to thereby determine said first acoustic range from each transponder in said array;

(d) calculating a number of second acoustic ranges, each one of said second acoustic ranges being equal to the total distance from said platform to a selected one of said transponders in said array and thence from said selected one of said transponders to the vehicle by transmitting at least one acoustic interrogation signal from said platform, each said transponder responding to said at least one acoustic interrogation signal by transmitting a reply signal, said signal receiving means on board said vehicle receiving said reply signal, measuring the elapsed time for the sound to travel from the platform separately to each of said transponders and thence from each of said transponders to the vehicle to thereby determine the acoustic distances from the platform to the vehicle via each of said transponders; and (e) calculating the distance the platform is from each transponder using the first acoustic ranges and the second acoustic ranges for each transducer.

2. The method of claim 1, further including the steps of:

(f) calculating a third acoustic range between said platform and said vehicle by transmitting an acoustic signal, receiving the acoustic signal and measuring the elapsed time to determine said third acoustic range; and (g) using said third acoustic range to improve the accuracy of the calculation performed in step (e).

3. The method of claim 1, wherein said platform is a ship and said vehicle is a submersible.

4. The method of claim 1, wherein said platform is a work vehicle and said first mentioned vehicle is a ship.

5. A system for acoustically positioning a noisy platform comprising:

(a) an array of transponders adapted to be deployed in a region of water;

(b) a transducer mounted on said noisy platform;

(c) a transducer mounted on a relatively quiet vehicle tethered to said platform;

(d) first means for transmitting acoustical energy from the transducer on said noisy platform to said array and from said array to said transducer on said vehicle for measuring the distance from said noisy platform to said quiet vehicle via said transponders in said array;

(e) second means for transmitting acoustical energy from the transducer on said vehicle to said array and back to said vehicle for measuring the distance said vehicle is from the transponders in said array; and (f) calculating means coupled to said first and second means for determining the location of said noisy platform relative to said array.

6. The system of claim 5, wherein said platform is a ship and said vehicle is a submersible.

7. The system of claim 6, wherein said calculating means is located aboard said ship.

8. The system of claim 5, wherein said platform is a work vehicle and said first mentioned vehicle is a ship.

9. The system of claim 8, wherein said calculating means is located aboard said ship.

* * * * *